United States Patent [19]

Nixon et al.

[11] 4,303,359

[45] Dec. 1, 1981

[54] DEBURRING APPARATUS

[76] Inventors: Raymond F. Nixon, 760 Orion Apt. 232, Lake Orion, Mich. 48035; Gaitskill S. Barr, 25800 Meadowdale, Franklin, Mich. 48025

[21] Appl. No.: 46,814

[22] Filed: Jun. 8, 1979

[51] Int. Cl.³ .............................................. B23F 19/10
[52] U.S. Cl. ......................................... 409/9; 409/58
[58] Field of Search ............................ 409/8, 9, 57, 58

[56] References Cited

U.S. PATENT DOCUMENTS

| | | | |
|---|---|---|---|
| 2,668,480 | 2/1954 | Christman | 409/9 |
| 2,950,654 | 8/1960 | Straw | 409/8 |
| 2,976,772 | 3/1961 | Straw | 409/8 |
| 3,286,593 | 11/1966 | Bibbens | 409/8 |

*Primary Examiner*—Z. R. Bilinsky
*Attorney, Agent, or Firm*—Gifford, Van Ophem, Sheridan & Sprinkle

[57] ABSTRACT

A deburring apparatus is provided for automatically deburring gears having a plurality of external or internal extending teeth formed therealong at predetermined intervals from each other. The apparatus comprises a frame having a spindle on which the gear to be deburred is mounted. A main shaft is rotatably supported within the frame which, upon rotation, incrementally indexes the gear mounted on the spindle for a distance corresponding to the distance between adjacent gear teeth and, after doing so, interrupts the rotation of the spindle for a predetermined period of time. Both an eccentric member and a cam are secured to the shaft. In addition a cutting tool arm is rotatably secured at one end to the eccentric member and, at its other end, a cutting tool is mounted. A bell crank is also pivotally secured to the frame and has a cam follower mounted to one end which engages the cam. A roller is secured to the other end of the bell crank which abuts against the cutting tool arm so that pivotal action of the bell crank due to the cam imparts a corresponding pivotal action to the cutting tool arm. The eccentric member and cam work in conjunction with each other to pivot and position the cutting tool arm during the predetermined time period when the gear is stationary so that the cutting member engages the space or trough between the gear teeth and, by a cutting action, removes any burrs from the gear. Prior to the next incremental rotation of the gear via the spindle, the eccentric member and cam retract and pivot the cutting tool arm and its attached cutting tool outwardly and away from the gear on the spindle.

9 Claims, 6 Drawing Figures

DEBURRING APPARATUS

BACKGROUND OF THE INVENTION

I. Field of the Invention

The present invention relates generally to deburring machines and, more particularly, to such a machine designed for deburring gears.

II. Description of the Prior Art

Gears and other toothed elements, hereinafter collectively referred to as gears for brevity, are typically manufactured by a hobbing operation. The hobbing operation, however, disadvantageously creates burrs on the back side of the gear which is manufactured (with respect to the hobbing apparatus) which become very brittle following heat treatment of the gear. After the gear is assembled in a machine mechanism, such as a transmission, the burrs can severely damage, and even destroy, the mechanism if they become broken off from the gear.

As a result of this, the gears are typically deburred prior to their assembly in a machine mechanism. Removal of the burrs can be accomplished manually with a file or other similar means, but the manual removal of burrs is not only time consuming but also unduly expensive in labor costs.

There have, however, been a number of previously known machines capable of removing burrs from gears. Typically these previously known machines operate by forming, usually by grinding or cutting prior to heat treatment, a chamfer along the gear which removes any burrs which may be present.

These previously known deburring machines, however, are disadvantageous in a number of different respects. First, these previously known deburring machines are very slow in operation and thus, capable of only limited operating production in use.

A still further disadvantage of these previously known machines is that these deburring machines are unduly complex and expensive in construction. Moreover, many of these machines employ parts, such as grinding wheels which must be periodically replaced during operation of the duburring machine. The replacement of such parts not only results in downtime for the deburring machine, but is also expensive in maintenance materials and labor costs.

SUMMARY OF THE PRESENT INVENTION

The president invention provides a deburring apparatus for gears which overcomes all of the above mentioned disadvantages of the previously known deburring machines.

In brief, the deburring apparatus according to the present invention comprises a housing having a main shaft rotatably mounted within the housing while means are provided to rotatably drive the main shaft at a substantially continuous rotational speed. A spindle means is also mounted to the housing on which a gear to be deburred is mounted.

The deburring apparatus further includes indexing means to incrementally rotate the spindle at intervals corresponding to the distance between adjacent teeth on the gear and to interrupt the rotation of the spindle means for a predetermined period of time during each incremental rotation. In the preferred form of the invention, the indexing means comprises an interrupted worm gear secured to the main shaft which cooperates with a gear wheel rotatably journaled on the frame. The gear wheel in turn rotatably drives the spindle via an idler gear wheel and a driving gear wheel secured to the spindle means. This gearing arrangement also permits the incremental rotation of the spindle means to be varied by simply changing one or more of these gear wheels.

Both an eccentric bushing and a cam having an outer cam surface are connected to the main shaft. An elongated cutting tool arm is secured for rotation at one end to the eccentric bushing and, at its other end, carries a cutting tool so that upon rotation of the main shaft, the cutting tool arm and its cutting tool move reciprocally due to the eccentric bushing.

A bell crank is also pivotally mounted to the frame and, at one end, has a cam follower which engages the outer cam surface of the cam. At its other end, a roller on the bell crank abuts against the cutting tool arm and reciprocally pivots the cutting tool arm about the main shaft in dependence upon the contour of the cam surface.

Both the position of the cutting tool arm and the cutting tool are thus dependent upon both the eccentric bushing and the cam. In the operation of the deburring apparatus of the present invention, the main shaft is rotatably driven at a constant speed thus indexing the spindle means and the gear mounted thereon sequentially between adjacent gear teeth and so that the spindle means and its attached gear are stationary for a predetermined period of time during each incremental rotation of the spindle means. During this predetermined period of time, the cam via its bell crank moves the cutting member into the space or trough between adjacent teeth on the gear to be deburred and simultaneously the eccentric member moves the cutting member into cutting position for the gear tooth edge(s) to be chamfered. Thereafter, while the gear to be deburred remains stationary, the cam via the bell crank draws the cutting tool arm and its attached tool through the tooth edge(s) of the gear to be deburred thus chamfering the edge(s) and removing any burrs which might be contained thereon. Once this has been accomplished, the eccentric member retracts the cutter away from the tooth surface and the cam pivots the cutting member outwardly away from the gear which has been deburred to permit the indexing means to rotate the gear to its next incremental position without interference with the cutting member. This process is then repeated.

As will become hereinafter apparent, the deburring apparatus according to the present invention is relatively simple and inexpensive in construction and yet is very rapid in operation. In practice, the deburring apparatus of the present invention is capable of deburring up to fifteen gear teeth per second.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
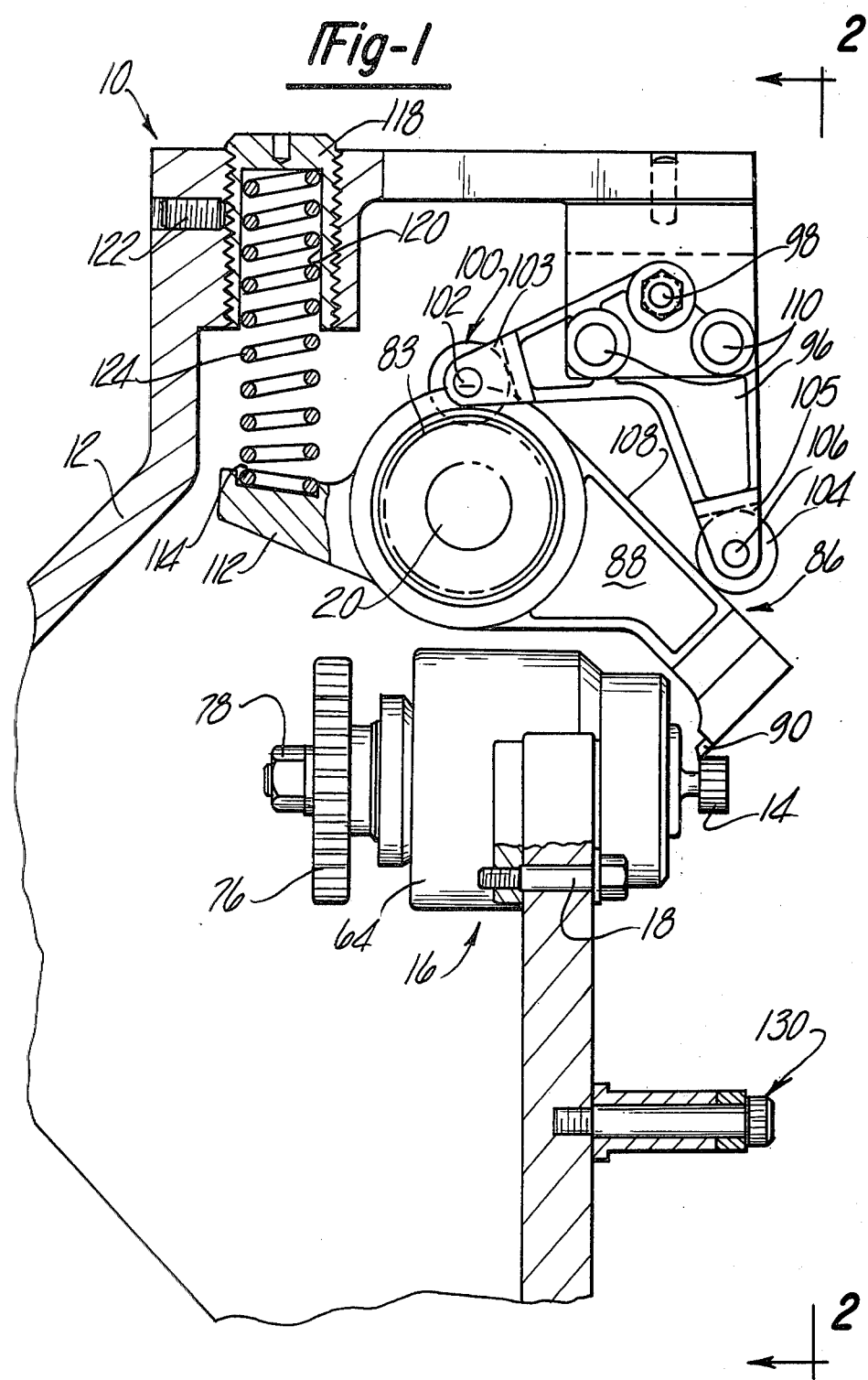
FIG. 1 is a fragmentary partial sectional side view illustrating the deburring apparatus according to the present invention.
Figure 2:
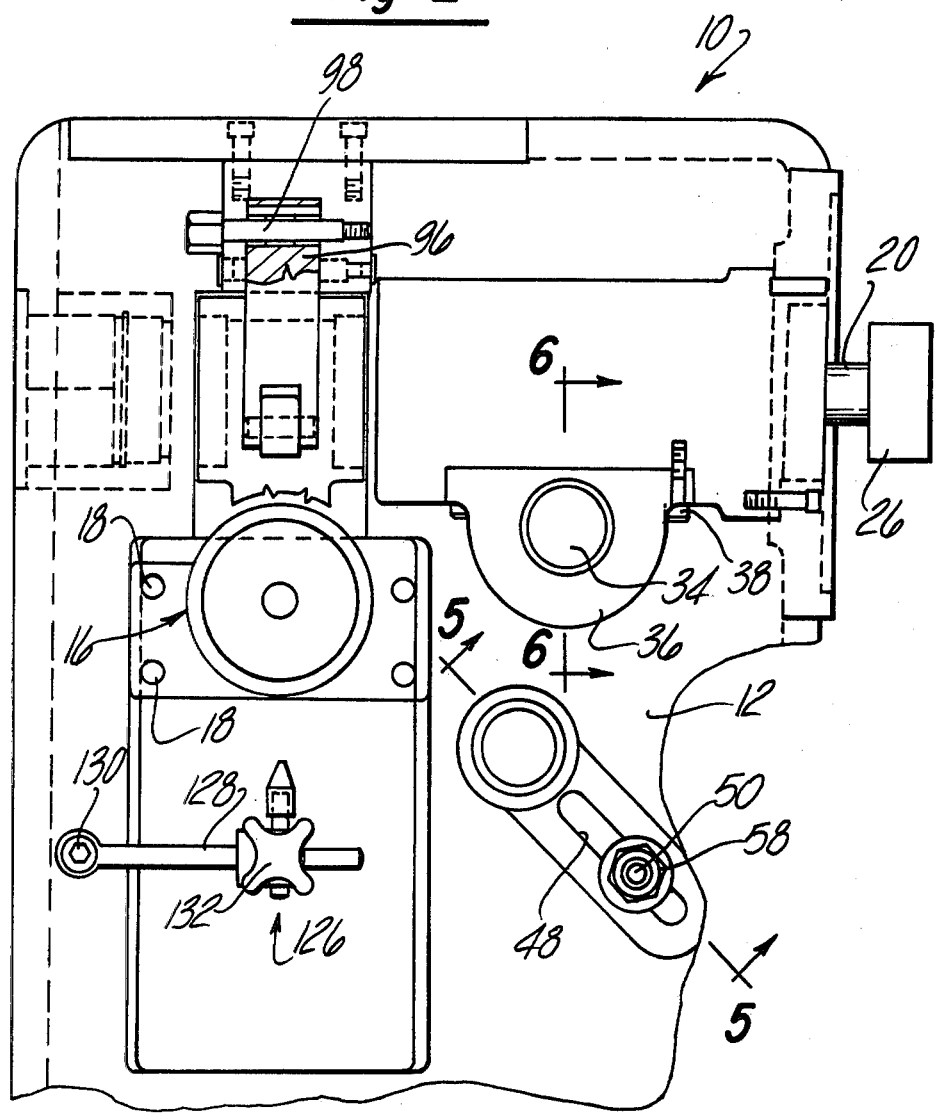
FIG. 2 is a fragmentary front view of the deburring apparatus according to the present invention, taken substantially along line 2—2 in FIG. 1 and with parts removed for clarity.

With reference first to FIGS. 1 and 2, the deburring apparatus 10 according to the present invention is thereshown and comprises a housing or frame 12. A gear 14 to be deburred is mounted by a spindle means 16, which will be subsequently described in greater detail, which in turn is secured to the frame 12 by bolts 18.

Figure 3:
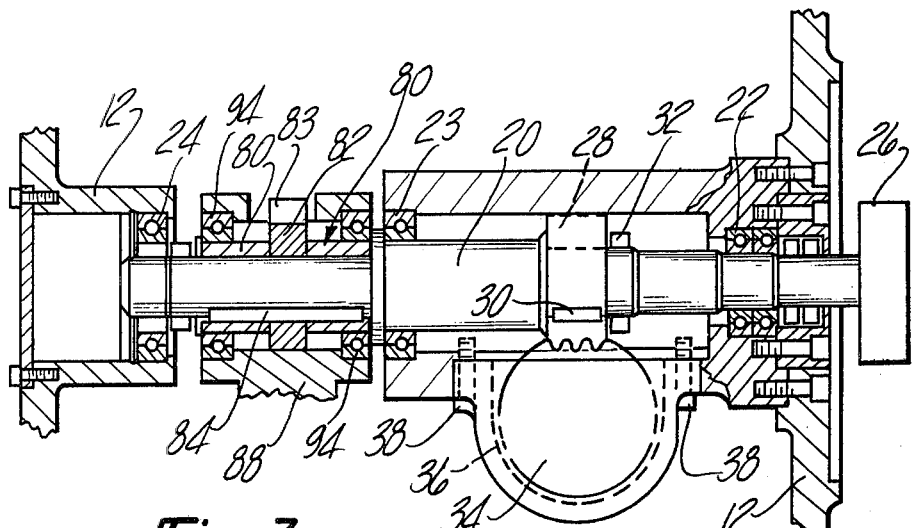
FIG. 3 is a fragmentary sectional front view showing a portion of the deburring machine and with parts removed for clarity.

With reference now particularly to FIGS. 2 and 3, a main shaft 20 is rotatably journalled by bearings 22, 23 and 24 to the frame 12. A motor and a clutch means 26 (illustrated only diagrammatically) is connected to the main shaft 20 to selectively rotatably drive the main shaft 20 at a substantially constant speed.

A worm gear 28 is secured by a key 30 and locknut 32 to the main shaft 20 at a midpoint of the shaft 20 so that the gear 28 rotates in unison with the main shaft 20. The worm gear 28 meshes or cooperates with a gear wheel 34 which is rotatably mounted in a journal 36 which in turn is secured to the housing 12 by bolts 38. The worm gear 28, however, is interrupted along substantially one-half its outer periphery so that despite continuous rotation of the main shaft 20, the gear wheel 34 is rotatably driven by the worm gear 28 only during one-half of a revolution of the worm gear 28 and the gear wheel 34 then remains stationary for the remaining one-half of a revolution of the main shaft 20.

Figure 5:
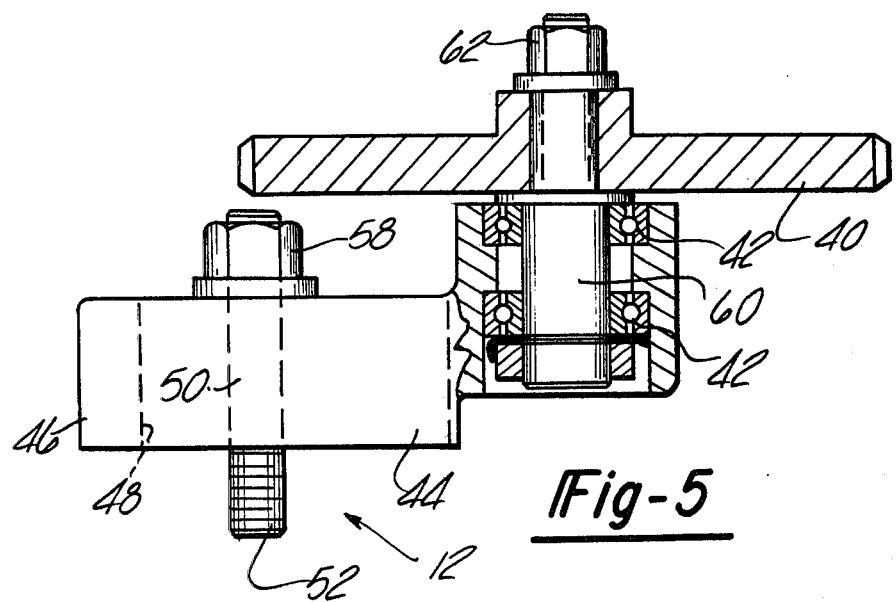
FIG. 5 is a sectional view taken substantially along line 5—5 in FIG. 2 with parts removed and enlarged for clarity.
Figure 6:
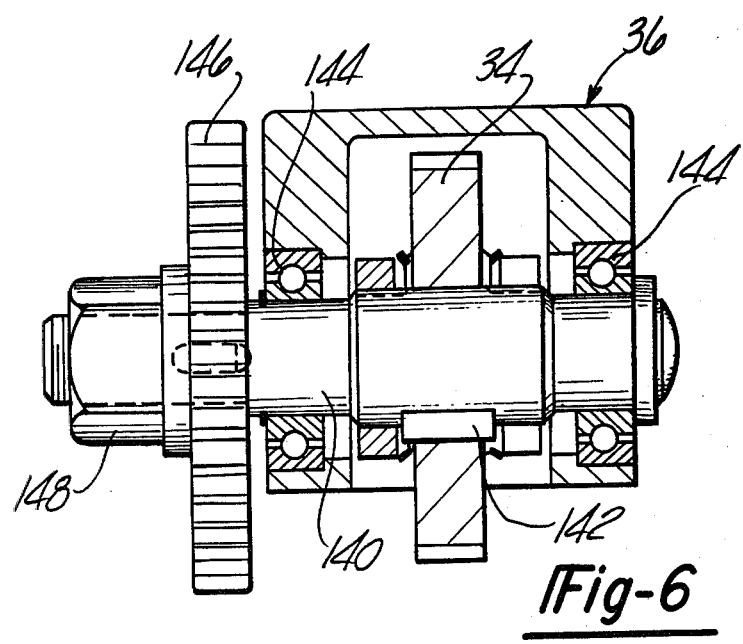
FIG. 6 is a sectional view taken along line 6—6 in FIG. 2 and enlarged for clarity.

With reference now to FIGS. 2, 5 and 6, the gear wheel 34 is secured to shaft 140 by a key 142 and the shaft 140 is in turn rotatably mounted in the journal 36 by bearings 144. A driven gear 146 is removably secured to one end of the shaft 140 by a nut 148 and the driven gear 146 in turn meshes with an idler gear 40 within the housing 12. The idler 40 is rotatably journalled by bearings 42 within a gear support 44 having a radially outwardly extending portion 46. An elongated slot 48 is formed through the portion 46 while a stud 50 extends through the slot 48 and threadably engages the housing 12 at its inner end 52. In this fasion, the position of the gear support 44 with its attached idler gear 40 is longitudinally adjustable along the axis of the slot 48 for a reason to be subsequently described. When the desired position of the gear support 44 is obtained, the gear support 44 is locked into position by a nut 58. In addition, the idler gear 40 is removably secured to its shaft 60 by means of a nut 62, also for a reason to be subsequently described.

Figure 4:
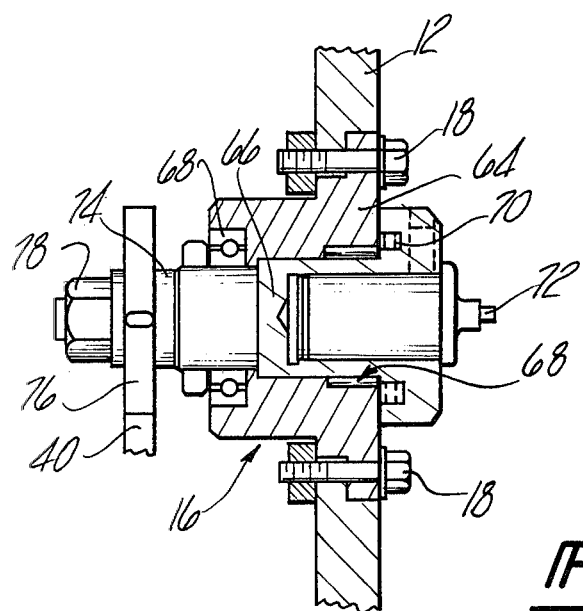
FIG. 4 is a longitudinal sectional view illustrating the part spindle means for the deburring machine according to the present invention.

With reference now to FIG. 4, the part spindle means 16 further includes a spindle housing 64 which is secured to the main housing 12 by the bolts and nuts 18. A spindle shaft 66 is rotatably mounted in the spindle housing 64 by bearings 68 and thrust bearings 70. A part adapter means 72 is provided at one end of the spindle shaft 66 for detachable securement of the gear 14 (FIG. 1) to be deburred. The opposite end 74 of the spindle shaft 66 protrudes outwardly from the opposite end of the spindle housing 64 and has a spindle drive gear 76 detachably secured to it by a nut 78. The spindle drive gear 76 is in mesh with the idler gear 40.

The main shaft 20 together with the interrupted worm gear 28, gear wheel 34, driven gear 146, idler gear 40 and spindle drive gear 76 form the means for incrementally indexing the gear 14 to be deburred. In brief, during one-half revolution of the main shaft 20, the interrupted worm gear 28 rotatably drives the gear wheel 34 which, via the driven gear 146, idler gear 40 and spindle drive gear 76, rotatably drives the gear 14 to be deburred and which is mounted on the adapter 72 a rotational amount equal to the increment between adjacent teeth on the gear 14 to be deburred. Then, due to the interrupted worm gear 28, the spindle shaft 66 with its attached gear 14 remains stationary for a predetermined period of time, corresponding to one-half revolution of the main shaft 20, and during which time the deburring operation will be performed as will be subsequently described. It will be understood, however, that the interruption of the worm gear 28 along one-half of its circumference is by way of example only and that the predetermined period of time at which the spindle shaft 66 is stationary can be varied as desired or required by varying the amount of interruption of the worm gear 28.

The removability of the idler gear 40, the driven gear 146 and the spindle drive gear 76 from their respective shafts permits a simple, rapid and yet effective means for adjusting the incremental rotation of the part spindle shaft 66 with its attached gear 14 per revolution of the main shaft 20. This, of course, enables the deburring apparatus 10 of the present invention to be used with gears having a different number and size of teeth to be deburred. The bolts 50 and slot 48 arrangement between the idler gear and the main housing 12 permits the actual positon of the idler gear to be simply and rapidly adjusted to accommodate an idler gear 40, driven gear 146 and spindle drive gear 76 of different sizes.

With reference now primarily to FIGS. 1 and 3, eccentric bushings 80 and a cam 82 having an outer cam surface 83 are secured by a key 84 to the main shaft 20 at a position axially spaced from the interrupted worm gear and so that both the eccentric bushings 80 and cam 82 rotate in unison with the main shaft 20. A cutting tool means 86 having an elongated cutting tool arm 88 with a cutting tool 90 is provided for performing the deburring operation on the gear 14 held by the spindle means 16. The shape of the cutting tool 90 substantially conforms to the shape of the trough between adjacent gear teeth on the gear 14 to be deburred. The cutting tool arm 88 is rotatably connected by bearings 94 to the eccentric bushings 80 so that the cutting tool arm 88 with its attached cutting tool 90 radially moves in dependence upon the eccentricity of the bushings 80 upon rotation of the main shaft 20.

A bell crank 96 is secured by a pivot pin 98 at midpoint to the housing 12 so that the pivot pin 98 is parallel to but spaced from the axis of the main shaft 20. A cam follower 100, preferably a roller, is rotatably mounted by a pin 102 to one end 103 of the bell crank 96 so that the cam follower 100 engages the outer cam surface 83 of the cam 82. A similar roller 104 is rotatably mounted by a pin 106 to the other end 105 the bell crank 96 so that the roller 104 engages one side 108 of the cutting tool arm 88. Thus, upon rotation of the main shaft 20, the cam follower 100 pivots the bell crank 96 around the pivot pin 98 in accordance with the cam surface 83 of the cam 82 and, by doing so, pivots the cutting tool arm 88 around the axis of the main shaft 20 due to the engagement of the roller 104 with the cutting tool arm 88.

The precise position of the cutting tool arm 88, and thus the position of the cutting tool 90, is dependent upon the combination of the eccentric bushings 80 which directly radially extends and retracts the cutting tool arm 88 and upon the cam 82 which pivots the cutting tool arm 88 about the axis of the main shaft 20 via the bell crank 96. Moreover, as is shown in FIG. 1, the bell crank 96 preferably includes additional pivot bores 110 so that the pivot pin 98 can be connected to any one of the three pivot bores 110 which are provided through the bell crank 96. Repositioning the pivot pin 98 into one of the other pivot bores 110 in the bell crank 96 will change the depth of the stroke of the cutting tool arm 88 caused by the cam 82 and bell crank 96.

Referring now to FIG. 1, the cutting tool arm 88 includes an outwardly extending projection 112 having an upper recess 114. A cylindrical spring retainer cap 118 having a central cavity 120 is secured to the main housing 12 by a threaded member 122 so that the cavity 120 and recess 114 face each other. An elongated helical spring 124 is positioned within and between the cavity 120 in the spring retainer cap 118 and the recess 114 in the cutting arm portion 112 so that the helical spring 124 is in a state of compression. The helical spring 124 thus urges the cutting tool arm 88 in a counterclockwise direction around the main shaft, as viewed from FIG. 1, and insures that the cutting tool arm 88 remains in contact with the roller 104.

With reference now particularly to FIGS. 1, 2 and 3, the operation of the deburring apparatus 10 according to the present invention will now be described. The gear 14 to be deburred is first mounted on the spindle means 16. Then, at a position at which the worm gear 34 is in dwell with the interrupted worm gear 28, the gear 14 is rotated in order to bring the cutting tool member 90 into alignment with a trough between two gear teeth on the gear 14. For this purpose, a gear alignment device 126 is preferably slidably mounted to a rod 128 attached to the housing 12 by a bolt 130 and having locking means 132 to adjustably lock it into position as required along the bar 128.

After the gear 14 is properly aligned with respect to the cutting tool 90, it is locked in position via adapter 72 (FIG. 4) and the clutch and motor means 26 are activated in order to rotatably drive the main shaft 20. In doing so, and assuming that the main shaft 20 is rotatably positioned at the finish of a deburring operation, the main shaft 20 first indexes the gear 14 to its next rotational position via the worm gear 28, driven gear 146, gear wheel 34, idler gear 40 and spindle drive gear 76 in the manner that has been previously described (FIGS. 4 and 6). Following the indexing operation, the gear 14 remains stationary for a predetermined period of time and, at this time, the cutting tool 90 is aligned with a trough between two adjacent gear teeth on the gear 14 to be deburred.

Upon the continued rotation of the main shaft 20, the eccentric bushings 80 move the cutting tool 90 into a cutting position throughout approximately a 45 degree rotation of the main shaft 20. At this point, the cam 82 and bell crank 96 pivot the cutting tool 90 which extends the tool 90 through the trough between gear teeth, thus chamfering the teeth.

During the next 45 degrees of rotation of the main shaft 20, the eccentric bushings 80 move the cutting tool 90 out of engagement with the surface of the gear 14.

The continued rotation of the main shaft 20 then allows the spring 124 cooperating with cam 82 to retract arm 88 and tool 90 back to the start position and, in doing so, performs the deburring operation.

After the cutting tool 90 has been retracted from the gear 14, the interrupted worm gear 28 again advances and rotatably drives the gear wheel 34 which ultimately rotates the gear 14 to its next indexed or incremental rotational position whereupon the above described deburring process is repeated.

It can thus be seen that the deburring apparatus 10 according to the present invention provides a unique device for deburring gears or other toothed elements. The combination of the cam and eccentric bushing to control the position of the cutting tool arm, and thus of the cutting tool, provides extremely rapid extension and retraction of the cutting tool and retraction of the cutter 90 away from the tooth surface and of the overall deburring operation. In practice, it has been found that up to 15 deburring operations per second can be achieved with the apparatus 10 of the present invention.

The deburring apparatus of the present invention is further advantageous in that it is relatively simple and inexpensive in construction. Moreover, since the burrs are removed from the gear 14 by a cutting action of the cutting tool, only infrequent resharpening of the cutting member is required.

Having described our invention, however, many modifications thereto will become apparent to those skilled in the art to which it pertains without deviation from the spirit of the invention as defined by the scope of the appended claims.

We claim:

1. Apparatus for deburring a gear comprising:
   a frame;
   means for mounting a gear to be deburred to said frame;
   means for indexing a gear held by said mounting means between preselected rotational positions;
   a cutting tool means;
   means synchronized with said indexing means for moving said cutting tool means into working engagement with a gear held by said mounting means, said moving means further comprising an eccentric member and a cam having a cam surface;
   means for rotating said eccentric member and said cam in synchronism with said indexing means;
   means for rotatably connecting said eccentric member to said cutting tool means;
   means responsive to said cam surface of said cam for moving said cutting tool means in conjunction with said eccentric member and
   wherein said cam surface responsive means further comprises a bell crank, means for pivotally mounting said bell crank at a midpoint to said frame, cam follower means attached to said bell crank for engaging the cam surface of said cam so that said bell crank pivots about said pivot means in dependence upon said cam surface, and means for imparting the pivotal action of the bell crank to said cutting tool means.

2. The invention as defined in claim 1 wherein said cutting tool means comprises an elongated cutting tool arm which extends radially outwardly from the eccentric member, said cutting tool arm having a cutting tool member secured to it at a position radially spaced from said eccentric member, and wherein said imparting means comprises a portion of the bell crank in abutment with said cutting tool arm.

3. The invention as defined in claim 1 wherein said pivot means further comprises means for pivotally securing said bell crank to said frame at at least two different positions.

4. The invention as defined in claim 1 wherein said indexing means further comprises means for incrementally rotating said mounting means a rotational distance corresponding to the distance between adjacent teeth on a gear held by said mounting means, said incremental rotating means including means interrupting the rotation of a gear held by the mounting means for a predetermined period of time during each complete rotation of the eccentric member rotating means wherein said moving means moves said cutting tool means into working position with a gear held by the mounting means during each of said predetermined periods of time.

5. The invention as defined in claim 4 wherein said incremental rotating means further comprises an interrupted worm gear secured to said eccentric member rotating means, a first gear wheel in mesh with said worm gear, a second gear wheel secured to and driven in unison with said first gear wheel and a third gear wheel in mesh with said second gear wheel, and a fourth gear wheel in mesh with said third gear wheel, said fourth gear wheel being drivingly connected to said mounting means, wherein at least one of said gear wheels is replaceable with a further gear wheel to thereby vary the incremental rotation of the indexing means.

6. The invention as defined in claim 5 and further comprising a gear mounting member for rotatably mounting said third gear wheel to the frame, means for adjustably securing said gear mounting member radially with respect to the axis of the third gear wheel and means for locking said gear mounting member in its adjusted position whereby said third gear wheel can mesh with said second and fourth gear wheels of varying diametric sizes.

7. The invention as defined in claim 1 and further comprising means for resiliently urging said bell crank against said imparting means.

8. The invention as defined in claim 1 wherein said cutting tool means further comprises a cutting tool member and wherein said moving means moves said cutting tool member into a trough between adjacent teeth on the gear to be deburred against the trough of the gear to be deburred and thereafter draws said cutting tool member axially with respect to the axis of the gear to be deburred along said trough.

9. The invention as defined in claim 1 wherein said synchronized moving means further comprises:
    means responsive to the rotational position of said eccentric member for radially moving said cutting tool means with respect to the axis of said rotating means between a gear engaging positon and a gear clearing position; and
    means responsive to the cam surface of the cam member for pivotally moving said cutting tool about the axis of the rotating means between an extended position and a retracted position.

* * * * *

UNITED STATES PATENT OFFICE
CERTIFICATE OF CORRECTION

Patent No. 4,303,359            Dated December 1, 1981

Inventor(s) Raymond F. Nixon

It is certified that error appears in the above-identified patent and that said Letters Patent are hereby corrected as shown below:

Column 1, line 49, delete "president", insert --present--.

Column 6, line 24, delete "burns", insert --burrs--.

Signed and Sealed this

Twenty-seventh Day of April 1982

|SEAL|

Attest:

Attesting Officer

GERALD J. MOSSINGHOFF
Commissioner of Patents and Trademarks